United States Patent
Burghardt

(10) Patent No.: US 10,253,692 B2
(45) Date of Patent: Apr. 9, 2019

(54) AIRCRAFT ENGINE HAVING A DEVICE FOR SEPARATING OIL

(71) Applicant: Rolls-Royce Deutschland Ltd & Co KG, Blankenfelde-Mahlow (DE)

(72) Inventor: Sascha Burghardt, Vogelsdorf (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 585 days.

(21) Appl. No.: 14/955,235

(22) Filed: Dec. 1, 2015

(65) Prior Publication Data

US 2016/0177825 A1 Jun. 23, 2016

(30) Foreign Application Priority Data

Dec. 18, 2014 (DE) .................. 10 2014 119 066

(51) Int. Cl.
 *F02C 7/06* (2006.01)
 *F01D 25/18* (2006.01)
 (Continued)

(52) U.S. Cl.
 CPC .............. *F02C 7/06* (2013.01); *F01D 25/18* (2013.01); *F01M 11/03* (2013.01); *F02C 3/107* (2013.01); *F02C 7/36* (2013.01); *F01M 2011/038* (2013.01); *F05D 2260/609* (2013.01); *Y02T 50/671* (2013.01)

(58) Field of Classification Search
 CPC ... F02C 7/06; F02C 7/36; F02C 3/107; F01M 11/03; F01M 2011/038; F01D 25/18; Y02T 50/671; F05D 2260/609; B01D 45/15
 See application file for complete search history.

(56) References Cited

U.S. PATENT DOCUMENTS 3,378,104 A * 4/1968 Venable ................. F01D 25/18
  184/6.12
4,049,401 A * 9/1977 Smith ................... B01D 45/14
  55/401

(Continued)

FOREIGN PATENT DOCUMENTS

EP 2085579 A1 8/2009
EP 2559869 A1 2/2013

(Continued)

OTHER PUBLICATIONS

German Search Report dated Aug. 3, 2015 for related German Application No. DE 10 2014 119 066.1.

(Continued)

*Primary Examiner* — Eldon T Brockman
(74) *Attorney, Agent, or Firm* — Shuttleworth & Ingersoll, PLC; Timothy Klima

(57) ABSTRACT

An aircraft engine having at least two shafts, each mounted rotatably about a center axis of the aircraft engine. A first shaft is driven, during operation of the aircraft engine, at a lower speed than a second shaft of the aircraft engine. A chamber limited at least in some areas by one of the shafts is provided, inside which is arranged a device for separating oil from an air-oil volume flow, said device being in operative connection with one of the shafts of the aircraft engine. The device for separating oil is in operative connection with the second shaft of the aircraft engine.

13 Claims, 4 Drawing Sheets

Figure 1:
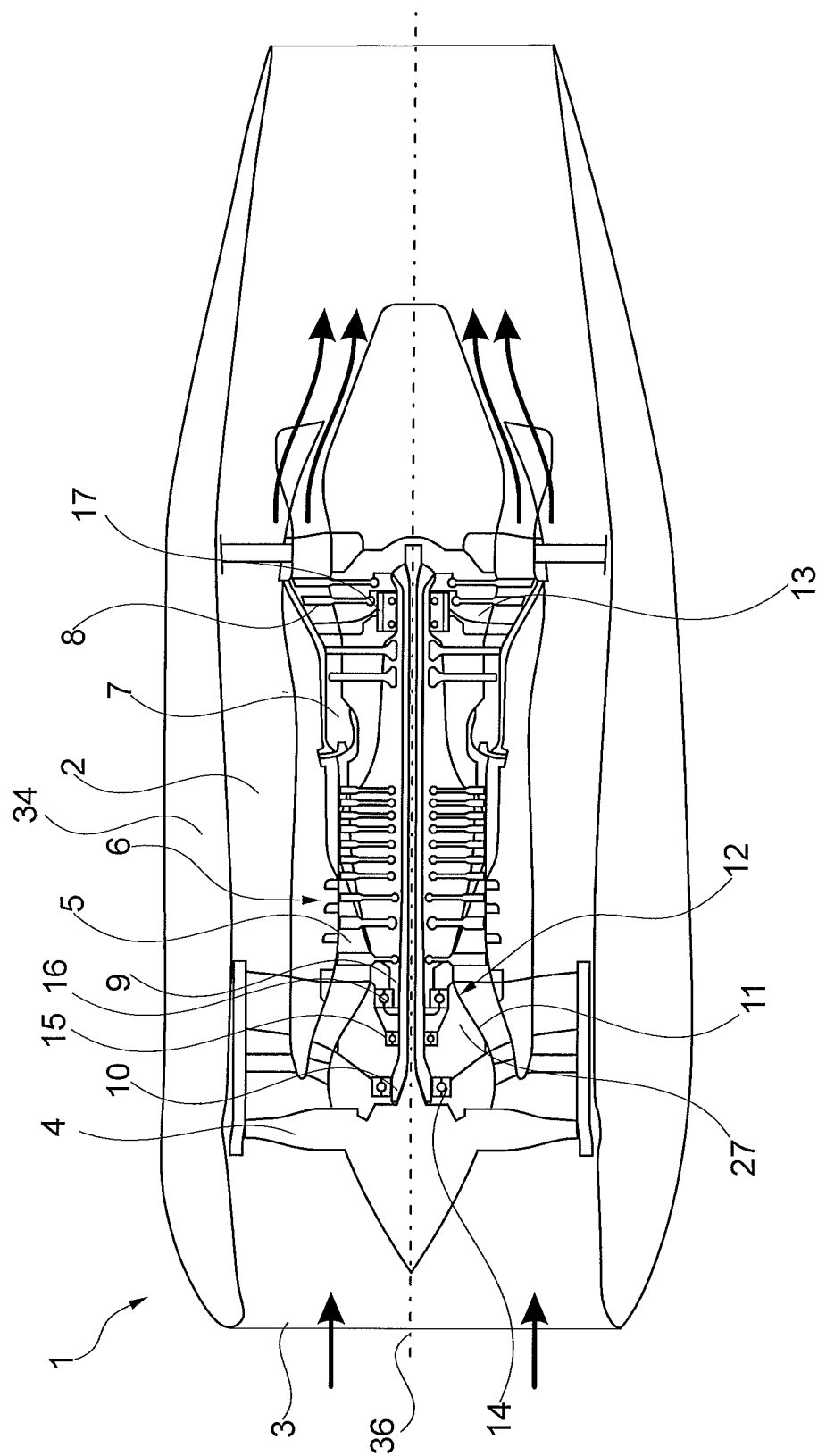

(51) Int. Cl.
*F01M 11/03* (2006.01)
*F02C 3/107* (2006.01)
*F02C 7/36* (2006.01)

(56) References Cited

U.S. PATENT DOCUMENTS

| | | | | |
|---|---|---|---|---|
| 4,714,139 A * | 12/1987 | Lorenz | ................ | B01D 19/0031 184/6.11 |
| 4,755,103 A * | 7/1988 | Streifinger | ............ | F04D 29/063 184/6.11 |
| 5,694,765 A * | 12/1997 | Hield | ....................... | F02C 3/113 60/39.163 |
| 5,716,423 A * | 2/1998 | Krul | ....................... | B01D 45/14 55/485 |
| 6,033,450 A * | 3/2000 | Krul | ....................... | B01D 45/14 55/345 |
| 6,398,833 B1 * | 6/2002 | Santerre | ................. | B01D 45/12 55/409 |
| 6,893,478 B2 * | 5/2005 | Care | ....................... | B01D 45/14 55/337 |
| 7,063,734 B2 * | 6/2006 | Latulipe | ............... | B01D 50/002 55/337 |
| 7,993,425 B2 * | 8/2011 | Corattiyil | ............. | F16N 39/002 138/89 |
| 8,051,952 B2 | 11/2011 | Bart et al. | | |
| 8,679,237 B2 * | 3/2014 | Angst | ................... | B01D 45/14 55/408 |
| 8,679,238 B2 * | 3/2014 | Angst | ................... | B01D 45/14 55/408 |
| 8,714,905 B2 | 5/2014 | Fintescu et al. | | |
| 8,752,673 B2 * | 6/2014 | Thivierge | ................ | F01D 25/20 184/6.11 |
| 8,876,933 B2 * | 11/2014 | Short | .................... | F01M 13/04 415/115 |
| 8,945,284 B2 * | 2/2015 | Short | .................... | F01D 25/183 55/317 |
| 9,677,422 B2 * | 6/2017 | Beier | ...................... | F01D 25/18 |
| 2004/0098956 A1 * | 5/2004 | Care | ...................... | B01D 45/14 55/400 |
| 2005/0211093 A1 * | 9/2005 | Latulipe | ............... | B01D 50/002 95/270 |
| 2009/0133961 A1 * | 5/2009 | Corattiyil | ............... | B01D 45/14 184/6.26 |
| 2009/0134243 A1 | 5/2009 | Mount et al. | | |
| 2011/0048856 A1 * | 3/2011 | Thivierge | ................ | F01D 25/20 184/6.11 |
| 2011/0271837 A1 * | 11/2011 | Angst | .................... | B01D 45/14 96/61 |
| 2012/0204723 A1 * | 8/2012 | Angst | .................... | B01D 45/14 96/61 |
| 2013/0319240 A1 * | 12/2013 | Short | .................... | F01D 25/183 95/268 |
| 2015/0135663 A1 * | 5/2015 | Beier | ..................... | B01D 45/14 55/461 |
| 2015/0260100 A1 | 9/2015 | Trohel | | |

FOREIGN PATENT DOCUMENTS

| | | |
|---|---|---|
| FR | 2929325 A1 | 10/2009 |
| WO | WO2014060656 A1 | 4/2014 |

OTHER PUBLICATIONS

European Search Report dated May 18, 2016 for counterpart European application No. 15197342.7.

* cited by examiner

AIRCRAFT ENGINE HAVING A DEVICE FOR SEPARATING OIL

This invention relates to an aircraft engine having at least two shafts, each mounted rotatably about a center axis of the aircraft engine, in accordance with the type defined in more detail herein.

From US 2009/0133961 A1, a jet engine is known having a low-pressure shaft and a high-pressure shaft. During operation of the jet engine, oil-laden consumed air is passed to a bearing chamber of a device for separating oil, designed as a centrifugal oil separator and also referred to as breather. The device is non-rotatably connected to the low-pressure shaft of the jet engine and is thus driven during operation of the jet engine with the low-pressure shaft about a center axis of the jet engine. During operation of the jet engine, oil particles are separated from the consumed air supplied to the device or from the air-oil volume flow and thus filtered out of the air. The oil separated by means of this procedure is passed via recesses of the device back into the bearing chamber, whereas the cleaned air is discharged to the environment through the low-pressure shaft, designed as a hollow shaft. Cleaned air is understood as a fluid volume flow discharged from the device and having a lower oil load than the air-oil volume flow supplied to the oil separator.

Since the speed of the low-pressure shaft during operation of the jet engine is relatively low, and the separation capacity of the device is dependent to a not inconsiderable extent on the speed of the low-pressure shaft, the fluid volume flow discharged from the device has an undesirably high oil load.

EP 2 559 869 A1 furthermore describes a jet engine having a device for separating oil. The device is connected, in the area of an accessory gearbox arranged radially outside bearing chambers of the jet engine, to an accessory gearbox shaft of the accessory gearbox. Due to the prevailing gear ratios in this case, the device is driven during operation of the jet engine by the accessory gearbox shaft at a speed required for a desired high separation capacity.

However, a jet engine of this type has the disadvantage of high manufacturing costs, besides having a high weight and at the same time requiring much space. This results from the fact that the device is driven via a separate accessory gearbox shaft of the accessory gearbox. Furthermore, in a jet engine of this type oil and air lines are required to pass the air-oil mixture out of the bearing chambers to the device arranged in the area of the accessory gearbox.

The object underlying the present invention is to provide a simply and cost-effectively producible aircraft engine having a device for separating oil, using which oil can be separated to the required extent from an air-oil volume flow supplied to the device during operation of the aircraft engine.

It is a particular object to provide a solution to the above problems by an aircraft engine having features as disclosed herein.

The aircraft engine in accordance with the invention is designed with at least two shafts each rotatably mounted about a center axis of the aircraft engine. A first shaft has, during operation of the aircraft engine, a lower speed than a second shaft of the aircraft engine. A chamber limited at least in some areas by one of the shafts is provided, inside which is arranged a device for separating oil from an air-oil volume flow, said device being in operative connection with one of the shafts of the aircraft engine.

In accordance with the present invention, it is provided that the device for separating oil is in operative connection with the second shaft of the aircraft engine.

Since the device for separating oil is, in the aircraft engine or jet engine designed in accordance with the invention, in an operative connection with the second shaft of the aircraft engine, said shaft representing in particular a high-pressure shaft having a higher speed than the first shaft during operation of the aircraft engine, the device is driven due to the higher speeds of the second shaft during operation of the aircraft engine to an extent required for a high separation capacity in a space-saving and cost-effective manner. Unlike in a design having a device arranged in the area of an accessory gearbox, the aircraft engine in accordance with the invention is advantageously of simple, cost-effective and weight-optimized design, since the accessory gearbox is designed without an accessory gearbox shaft intended exclusively for driving the device. Additionally, due to the arrangement of the device in the area of the chamber, either very short air/oil lines, or none at all, have to be provided to pass an air-oil volume flow from the bearing chambers to the device.

In a simply designed and space-saving embodiment of the aircraft engine in accordance with the invention, the device is non-rotatably connected to the second shaft of the aircraft engine and preferably arranged directly on the second shaft.

The device is, in an alternative embodiment of the aircraft engine in accordance with the invention, non-rotatably connected to a drive shaft in operative connection with the second shaft and intended to drive accessory units of an accessory gearbox. The drive shaft engages, preferably via a bevel gear stage, with the second shaft and as a result can be driven in simple manner at a high speed necessary for a good separation capacity. The device is preferably arranged in an end area of the drive shaft which is radially on the inside relative to the engine axis.

The device for separating oil is preferably designed as a centrifugal oil separator, which is also referred to as breather. The substantially annular-designed device encloses the second shaft in particular on the circumferential side.

In an advantageous embodiment of an aircraft engine in accordance with the invention, the device for separating oil is designed with a porous area that can be set into rotation. Oil particles from the air-oil volume flow supplied to the device can be separated by means of the porous area of the device in a simple manner and for example supplied to an oil tank. An area of the device acting as a centrifuge is provided for the separation in particular of large oil particles, whereas oil particles of lower diameters can be advantageously collected by the porous area, arranged in the oil separator and preferably designed as a metal foam or as a metal foam ring, and so likewise filtered out of the air-oil volume flow.

The device for separating oil can be brought into an operative connection with the second shaft by a simple design, if it has a casing device by means of which the device is arranged non-rotatably on the shaft.

In an advantageous embodiment of the aircraft engine in accordance with the invention, the aircraft engine has a third shaft rotatably mounted about the center axis and driven at a greater speed than the second shaft of the aircraft engine, said device being in an operative connection with the second or third shaft. In an aircraft engine of this type designed with three shafts too, where the first shaft represents a low-pressure shaft, the second an intermediate-pressure shaft and the third a high-pressure shaft, a high separation capacity can be achieved by means of the device in cost-effective and weight-optimized way. The device can, with an aircraft engine of this type, be arranged directly on the second shaft or on the third shaft or be operatively connected to one of these shafts to the extent described in more detail above.

If the shaft mounting the device is designed as a hollow shaft, the air cleaned in the area of the device can be discharged out of the aircraft engine through the hollow shaft in simple manner. If the device is arranged on the second or third shaft of the aircraft engine, the cleaned air can be passed through one of these shafts respectively, in particular into an exhaust jet of the aircraft engine. If however the device is arranged on the drive shaft of the accessory gearbox, the cleaned air is discharged via a line system through the accessory gearbox, in particular to the environment.

Cleaned air is understood in the present invention as being a fluid volume flow discharged from the device and having a lower oil load than the air-oil volume flow supplied to the oil separator.

In an advantageous embodiment of an aircraft engine in accordance with the invention, a sealing device is provided by means of which the chamber can be sealed off from an area limited by the first shaft, in particular from an interior limited by the shaft designed as a hollow shaft. The sealing device can be designed for example as a labyrinth seal or as a hydraulic seal, where other suitable sealing devices can also be provided.

The chamber of the aircraft engine is preferably designed as a bearing chamber having at least one bearing device, in the area of which an air-oil mixture is created during operation of the aircraft engine by mixing of sealing air intended for sealing off the bearing chambers, i.e. in particular air under high pressure from a core flow duct of the aircraft engine, and oil intended for lubrication of the bearing devices. In aircraft engines designed with two shafts, at least one front and one rear bearing chamber are provided in the axial direction of the aircraft engine, whereas in aircraft engines designed with three shafts at least one middle bearing chamber can be provided in addition. The device can in principle be arranged in any of these bearing chambers.

In an advantageous embodiment of the aircraft engine designed in accordance with the invention, a further device for separating oil is provided inside a further bearing chamber of the aircraft engine and is operatively connected to the second shaft or third shaft of the aircraft engine, so that in this area too of the aircraft engine a high degree of oil separation from an occurring air-oil mixture can be achieved.

To permit cleaning of air-oil volume flows in the area of several bearing chambers in a cost-effective and space-optimized manner, at least one line area can be provided via which an air-oil volume flow can be passed from the at least one further bearing chamber into the bearing chamber of the aircraft engine. This allows the air-oil mixtures present in the area of two or more bearing chambers to be advantageously cleaned with a single device.

In an advantageous development of an aircraft engine in accordance with the invention, at least one line area is provided via which an air-oil volume flow can be passed from a tank device and/or from a casing device of an accessory gearbox into the bearing chamber of the aircraft engine having the device. As a result, oil from these air-oil volume flows discharged from these areas can also be advantageously separated in the area of the device operatively connected to the second or third shaft.

Both the features stated in the patent Claims and the features stated in the following exemplary embodiments of the aircraft engine in accordance with the invention are each suitable, singly or in any combination with one another, to develop the subject matter of the invention.

Further advantages and advantageous embodiments of the aircraft engine in accordance with the invention become apparent from the patent Claims and the exemplary embodiments described in principle in the following with reference to the accompanying drawing, where the same reference numerals are used for components of identical design and function for greater clarity.

Figure 2:
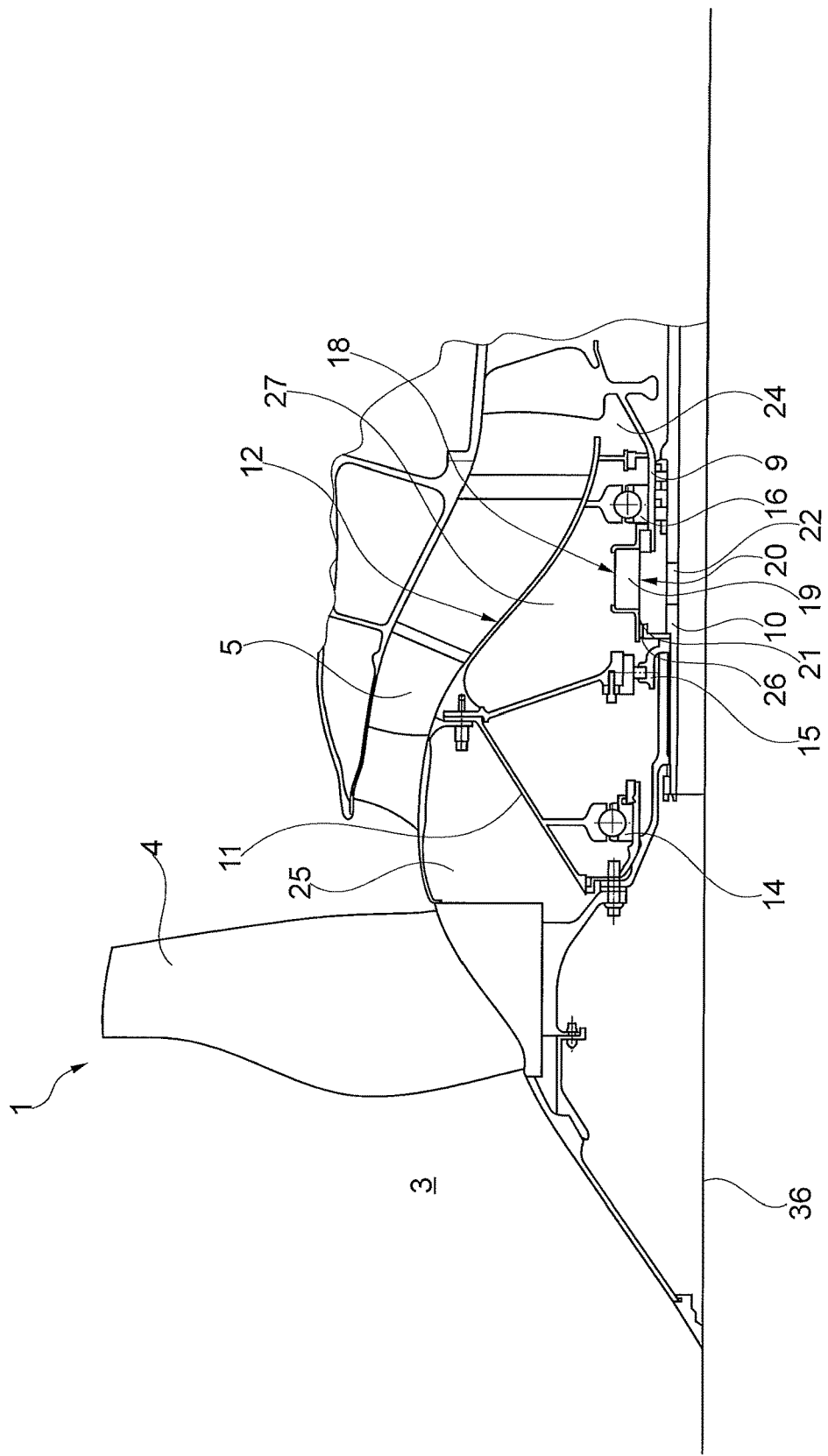
Figure 3:
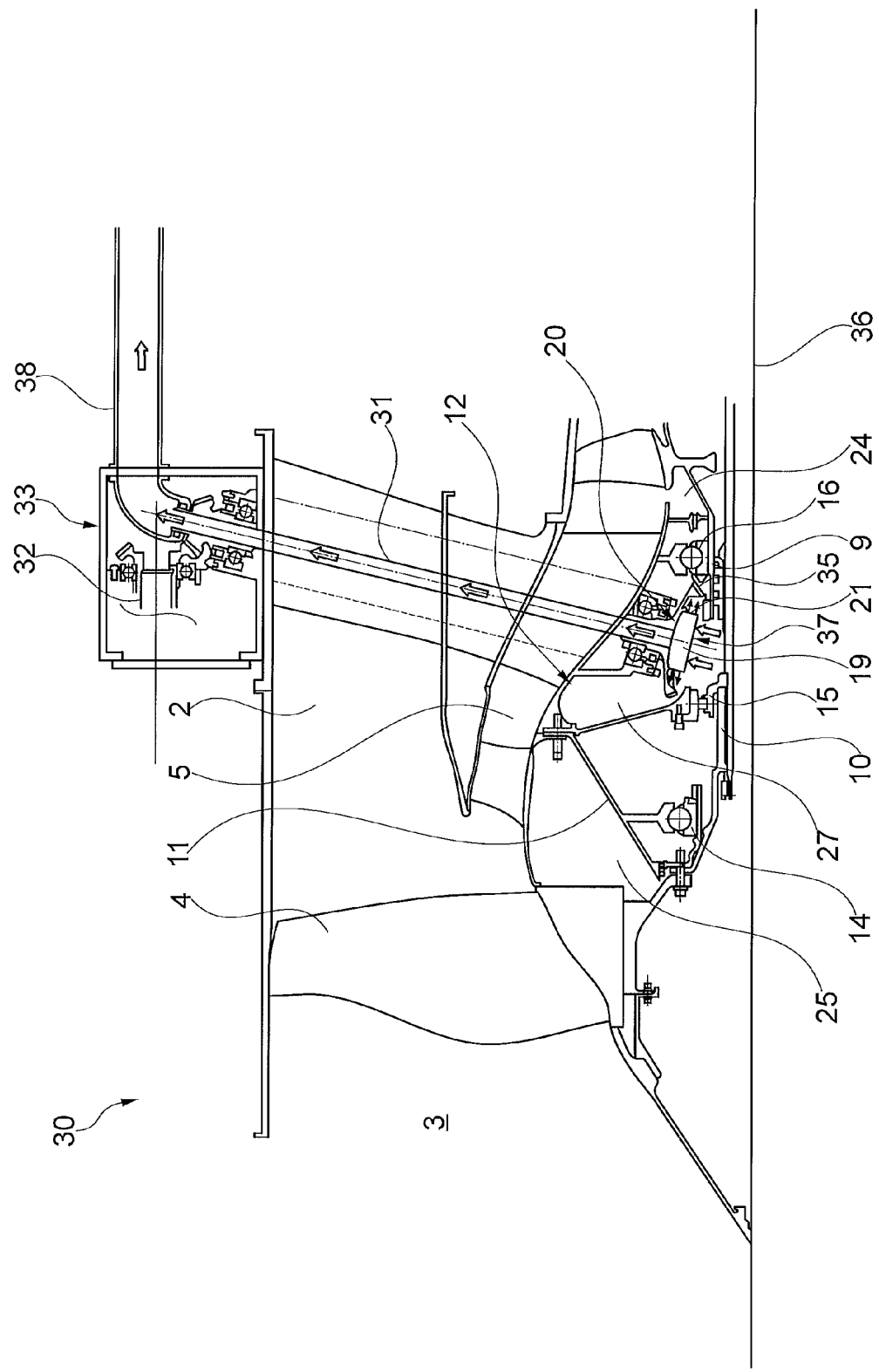
Figure 4:
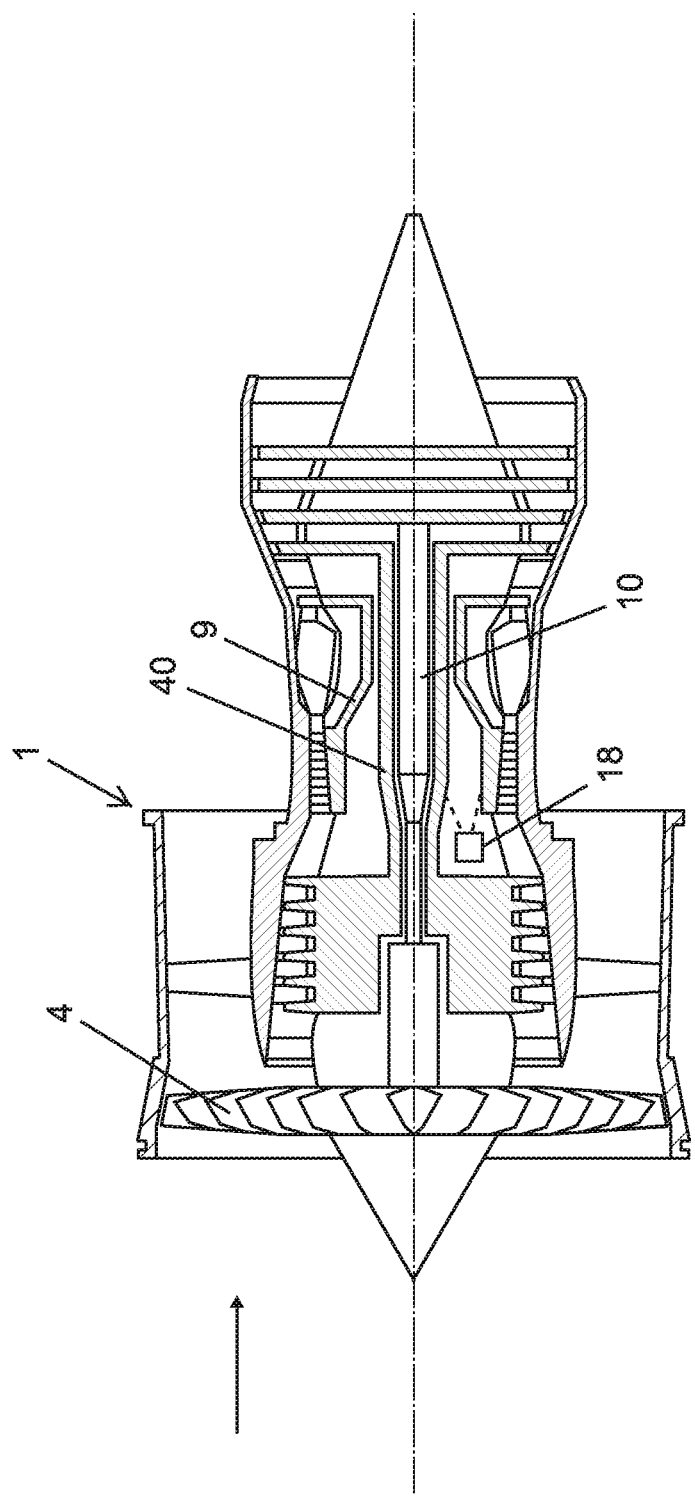

Here,

FIG. 1 shows a highly schematized longitudinal sectional view of an aircraft engine designed with a low-pressure shaft and a high-pressure shaft, FIG. 2 shows a simplified partial sectional view of the aircraft engine of FIG. 1, where a device for separating oil can be seen, which is arranged in the area of the front bearing chamber and is non-rotatably connected to the high-pressure shaft, FIG. 3 shows a simplified partial sectional view of an alternatively designed aircraft engine, where a device for separating oil is non-rotatably connected to a drive shaft of an accessory gearbox, with the drive shaft being coupled to the high-pressure shaft of the aircraft engine via a bevel gear, and FIG. 4 shows a highly schematized longitudinal sectional view of an aircraft engine having a low-pressure shaft, an intermediate-pressure shaft and a high-pressure shaft incorporating a device for separating oil.

FIG. 1 shows an aircraft engine or a jet engine 1 in a longitudinal sectional view. The aircraft engine 1 is provided with a bypass duct 2 and an intake area 3, where a fan 4 adjoins downstream the intake area 3 in a manner known per se. Again downstream of the fan 4, the fluid flow in the aircraft engine 1 splits into a bypass flow and a core flow, with the bypass flow flowing through the bypass duct 2 and the core flow into an engine core 5 which is in turn designed in a manner known per se with a compressor device 6, a burner 7 and a turbine device 8.

The aircraft engine 1 is in the present invention designed with two shafts, a first shaft representing a low-pressure shaft 10 and a second shaft representing a high-pressure shaft 9, said low-pressure shaft 10 and high-pressure shaft 9 each being rotatably mounted about a center axis 36. The low-pressure shaft 10 is non-rotatably connected to the fan 4 and rotates during operation of the aircraft engine 1 at a lower speed about the center axis 36 than the high-pressure shaft 9. For mounting the shafts 9, 10 relative to one another and relative to a casing device 11 of the aircraft engine 1, several bearing devices 14, 15, 16, 17 are provided. The bearing devices 14, 15, 16, each designed as anti-friction bearings, are in the present invention arranged in a bearing chamber 12 at the front in the axial direction of the aircraft engine 1, while the bearing device 17 also designed as an anti-friction bearing is mounted in a bearing chamber 13 at the rear in the axial direction of the aircraft engine 1.

FIG. 2 shows the front bearing chamber 12 in an enlarged view. A device 18 for separating oil is designed in the present invention as a centrifugal oil separator and is also referred to as breather. The device 18, whose mode of operation is explained in more detail in the following, has a porous area 20 provided with a metal foam ring 19 and non-rotatably connected via a casing device 21 of the device 18 to the high-pressure shaft 9.

During operation of the aircraft engine 1, the bearing chambers 12, 13 are subjected to an air volume flow taken from the core flow and also referred to as compressor bleed air, and thereby sealed off from chambers 24, 25 adjoining the bearing chamber 12. The compressor bleed air mixes here with oil intended for lubrication of the bearing devices 14, 15, 16, thus creating an air-oil volume flow or an oil mist in the area of the bearing chamber 12. Before consumed air is discharged from the aircraft engine 1, the oil load of the air used in the aircraft engine 1 must be reduced to a required level relative to which an oil consumption by the aircraft engine 1 and unwelcome emissions are low.

The low-pressure shaft 10 and the high-pressure shaft 9 are each designed as hollow shafts, with the low-pressure shaft 10 in an axial area of the aircraft engine 1 having at least one recess 22, in the region of which the device 18 is connected to the high-pressure shaft 9. The air-oil volume flow can flow through the recess 22 from the bearing chamber 12 through the high-pressure shaft 9 into the low-pressure shaft 10 and discharged to the environment through said low-pressure shaft 10 issuing into an exhaust jet in the axial direction of the aircraft engine 1 in a rearward area. Since a pressure in the bearing chamber 12 during operation of the aircraft engine 1 is greater than the pressure in the exhaust jet, the oil mist present in the area of the bearing chamber 12 during operation of the aircraft engine 1 flows as an air-oil volume flow in direction of the device 18.

The device 18 acts on the supplied air-oil volume flow as a centrifuge, by means of which a proportion of oil in the air-oil volume flow flowing through the porous area 26 of the device 18 is reduced. Furthermore, during flow through the porous area 20, which acts as an impingement filter, oil is separated from the air-oil volume flow. The oil filtered out of the air-oil volume flow in the area of the porous area 26 is ejected in the radial direction of the aircraft engine 1 outwards out of the device 18, extracted in a manner known per se from the bearing chamber 12 and supplied to an oil tank, arranged for example in the area of an accessory gearbox, not shown in detail. The air cleaned in the area of the device 18, i.e. a fluid volume flow with a lower oil load than the air-oil volume flow supplied to the oil separator, is passed in the radial direction of the aircraft engine 1 through the at least one recess 22 into an interior 23 limited by the low-pressure shaft 10 and passed from there rearwards in the direction of the exhaust jet and out of the aircraft engine 1. To seal off the bearing chamber 12 from the interior 23 of the low-pressure shaft 10, a sealing device 26 designed as a labyrinth seal is arranged between the casing device 21 and the low-pressure shaft 10.

The device 18 of overall annular design includes the high-pressure shaft 9 in the circumferential direction and is here non-rotatably connected to the high-pressure shaft 9, such that the device 18 is driven at the same speed as the high-pressure shaft 9. As a result, the device 18 arranged in an interior 27 of the front bearing chamber 12 is driven during operation of the aircraft engine 1 at high speeds, for example at approx. 18,000 to 20,000 rpm. A large proportion of the oil supplied to the device 18 via the air-oil volume flow is here separated by the device 18 from the air-oil volume flow and the cleaned airflow has an advantageously low oil content. As discussed above, the device for separating oil 18 can be used with a three shaft aircraft engine including a first shaft (low-pressure shaft 10), a second shaft (intermediate-pressure shaft 40) and a third shaft (high-pressure shaft 9), and can be connected to either of the second shaft (intermediate-pressure shaft 40) or the third shaft (high-pressure shaft 9), as schematically shown in FIG. 4.

FIG. 3 shows an aircraft engine 30 designed alternatively to the aircraft engine 1, and designed comparable in principle to the aircraft engine 1 in terms of its layout and operation. Accordingly, the following addresses only the differences of the aircraft engine 30 from aircraft engine 1 and refers in connection with the further mode of operation of aircraft engine 30 to the above description for FIG. 1 and FIG. 2.

Accessory gearbox shafts 32 of an accessory gearbox 33 shown in highly simplified form can be driven via a drive shaft 31. The accessory gearbox 33 is in the present invention arranged in the area of a casing 34 limiting the bypass duct 2 on the outside. The drive shaft 31, designed as a hollow shaft, is here coupled via a bevel gear stage 35 to the high-pressure shaft 9 and mounted using bearing devices 36 and 37 inside the casing device 11 or inside the casing 34. The drive shaft 31 thus rotates, depending on the gear ratio in the area of the bevel gear stage, at a speed corresponding to the speed of the high-pressure shaft 9 and greater than a speed of the low-pressure shaft 10.

In an area of the drive shaft 31 facing a center axis 36 of the engine 1, a device 37 again of annular design inside the front bearing chamber 12 is non-rotatably connected to the drive shaft 31 and is driven by the drive shaft 31. The drive shaft 31, designed as a hollow shaft, is connected in a radially outer end area in the area of the accessory gearbox 33 to a line area 38. The line area 38 is in turn connected to an outer area of the casing 34, so that the bearing chamber 12 is operatively connected to the environment via the drive shaft 31 and the line area 38. During operation of the aircraft engine 1, a pressure prevails in the area of the bearing chamber 12 that is higher relative to the ambient pressure, as already described in more detail above. This leads to an air-oil volume flow being passed from the bearing chamber 12 to the device 37. The air-oil volume flow is passed in the radial direction of the aircraft engine 1 substantially from the inside outwards and oil is separated from the air-oil volume flow in the area of the device 37. The separated oil is conveyed out of the device 37 and through the drive shaft 31 back into the bearing chamber 12, while the air cleaned in the area of the device 37 is discharged to the environment.

The device 37 is in principle designed comparable with the device 18, so that reference is made to the statements about the device 18 with regard to the further mode of operation of the device 37.

LIST OF REFERENCE NUMERALS

1 Aircraft engine
2 Bypass duct
3 Intake area
4 Fan
5 Engine core
6 Compressor device
7 Burner
8 Turbine device
9 High-pressure shaft
10 Low-pressure shaft
11 Casing device
12 Front bearing chamber
13 Rear bearing chamber
14 Bearing device; anti friction bearing
15 Bearing device; anti friction bearing
16 Bearing device; anti friction bearing
17 Bearing device; anti friction bearing
18 Device for separating oil
19 Metal foam ring
20 Porous area
21 Casing device
22 Recess
23 Interior 24 Chamber
25 Chamber
26 Sealing device; labyrinth seal
27 Interior
30 Aircraft engine
31 Drive shaft
32 Accessory gearbox shaft
33 Accessory gearbox
34 Casing
35 Bevel gear stage
36 Center axis
37 Device
38 Line area

What is claimed is:

1. An aircraft engine comprising:
at least two shafts, including a first shaft and a second shaft, each of the first shaft and the second shaft mounted rotatably about a center axis of the aircraft engine,
the second shaft having, during operation of the aircraft engine, a higher speed than the first shaft,
a chamber limited at least in some areas by one of the at least two shafts,
a device for separating oil from an air-oil volume flow arranged in the chamber, the device for separating oil including a centrifugal oil separator,
wherein the centrifugal oil separator includes:
a casing positioned externally of the second shaft and fixedly connected to the second shaft to rotate with the second shaft; and
a porous metal foam ring positioned in the casing.

2. The aircraft engine in accordance with claim 1, and further comprising a sealing device by which the chamber is sealed off from an area limited by the first shaft.

3. The aircraft engine in accordance with claim 1, wherein the second shaft is a hollow shaft.

4. The aircraft engine in accordance with claim 1, wherein the chamber of the aircraft engine is a bearing chamber having a bearing device and further comprising a line area via which an air-oil volume flow can be passed from a tank device into the bearing chamber.

5. The aircraft engine in accordance with claim 1, wherein the chamber of the aircraft engine is a bearing chamber having a bearing device and further comprising a line area via which an air-oil volume flow can be passed from a casing device of an accessory gearbox into the bearing chamber.

6. The aircraft engine in accordance with claim 1, wherein the second shaft is a high pressure shaft of the aircraft engine.

7. An aircraft engine comprising:
at least two shafts, including a first shaft and a second shaft, each of the first shaft and the second shaft mounted rotatably about a center axis of the aircraft engine,
the second shaft having, during operation of the aircraft engine, a higher speed than the first shaft,
a chamber limited at least in some areas by one of the at least two shafts,
a device for separating oil from an air-oil volume flow arranged in the chamber, the device for separating oil including a centrifugal oil separator,
a drive shaft in operative connection with the second shaft to be driven at a higher speed than the first shaft, the drive shaft operatively connected to drive an accessory unit of an accessory gearbox,
wherein the centrifugal oil separator includes:
a casing positioned externally of the drive shaft and fixedly connected to the drive shaft to rotate with the drive shaft; and
a porous metal foam ring positioned in the casing.

8. The aircraft engine in accordance with claim 7, wherein the second shaft is a high pressure shaft of the aircraft engine.

9. An aircraft engine comprising:
at least three shafts, including a first shaft, a second shaft and a third shaft, each of the first shaft, the second shaft and the third shaft mounted rotatably about a center axis of the aircraft engine,
the second shaft having, during operation of the aircraft engine, a higher speed than the first shaft, the third shaft having, during the operation of the aircraft engine, a higher speed than the second shaft,
a chamber limited at least in some areas by one of the at least three shafts,
a device for separating oil from an air-oil volume flow arranged in the chamber, the device for separating oil including a centrifugal oil separator,
wherein the centrifugal oil separator includes:
a casing positioned externally of the second shaft or the third shaft and fixedly connected to the second shaft or the third shaft, respectively to rotate with the second shaft or the third shaft, respectively; and
a porous metal foam ring positioned in the casing.

10. The aircraft engine in accordance with claim 9, wherein the chamber is a bearing chamber having a bearing device.

11. The aircraft engine in accordance with claim 10, and further comprising a further bearing chamber and a further device for separating oil, wherein in an area of the further bearing chamber, the further device for separating oil is fixedly connected to the second shaft or the third shaft to rotate with the second shaft or the third shaft, respectively.

12. The aircraft engine in accordance with claim 11, and further comprising a line area via which an air-oil volume flow can be passed from the further bearing chamber into the bearing chamber.

13. The aircraft engine in accordance with claim 9, wherein the second shaft is an intermediate pressure shaft of the aircraft engine and the third shaft is a high pressure shaft of the aircraft engine.

* * * * *